(12) United States Patent
Lin

(10) Patent No.: US 12,080,279 B2
(45) Date of Patent: *Sep. 3, 2024

(54) THREAT DETECTION SYSTEM THAT REFORMATS LOG RECORDS FOR NLP MODEL-BASED THREAT DETECTION PACKAGES

(71) Applicant: Rapid7, Inc., Boston, MA (US)

(72) Inventor: Wah-Kwan Lin, Melrose, MA (US)

(73) Assignee: Rapid7, Inc., Boston, MA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/947,295

(22) Filed: Sep. 19, 2022

(65) Prior Publication Data
US 2023/0012829 A1   Jan. 19, 2023

Related U.S. Application Data

(63) Continuation of application No. 16/454,282, filed on Jun. 27, 2019, now Pat. No. 11,475,882.

(51) Int. Cl.
| | | |
|---|---|---|
| *G10L 15/18* | (2013.01) | |
| *G06N 3/08* | (2023.01) | |
| *G06N 20/00* | (2019.01) | |
| *G10L 15/06* | (2013.01) | |
| *G10L 15/16* | (2006.01) | |

(52) U.S. Cl.
CPC ............... *G10L 15/18* (2013.01); *G06N 3/08* (2013.01); *G06N 20/00* (2019.01); *G10L 15/063* (2013.01); *G10L 15/16* (2013.01)

(58) Field of Classification Search
None
See application file for complete search history.

(56) References Cited

U.S. PATENT DOCUMENTS

| | | | |
|---|---|---|---|
| 6,470,306 B1 * | 10/2002 | Pringle | G06F 40/169 |
| | | | 715/236 |
| 9,292,487 B1 | 3/2016 | Weber | |
| 10,079,842 B1 * | 9/2018 | Brandwine | H04L 63/1441 |
| 10,909,138 B2 * | 2/2021 | Kothari | G06F 16/258 |
| 2013/0041647 A1 * | 2/2013 | Ramerth | G06F 40/53 |
| | | | 704/2 |
| 2017/0155643 A1 | 6/2017 | Fujishima et al. | |
| 2017/0353564 A1 * | 12/2017 | Zhou | H04L 67/10 |
| 2020/0098351 A1 | 3/2020 | Feinstein et al. | |
| 2020/0125489 A1 | 4/2020 | Kamauchi | |
| 2020/0387810 A1 | 12/2020 | Hodgson et al. | |

* cited by examiner

*Primary Examiner* — Quynh H Nguyen
(74) *Attorney, Agent, or Firm* — Ashwin Anand (57) ABSTRACT

Methods and systems for training a language processing model. The methods may involve receiving a first log record in a first format, wherein the first log record includes annotations describing items in the first log record, and then creating a second log record in a second format comprising data from the first log record utilizing the annotations in the first log record and a conversion rule set. The second log record may then be used to train a language processing model so that a trained model can identify items in a third log record and the relationships therebetween.

20 Claims, 6 Drawing Sheets

THREAT DETECTION SYSTEM THAT REFORMATS LOG RECORDS FOR NLP MODEL-BASED THREAT DETECTION PACKAGES

This Application claims priority under 35 U.S.C. § 120 and is a continuation of U.S. patent application Ser. No. 16/454,282, filed Jun. 29, 2019, titled "Generating Training Data for Machine Learning Models," the entire contents of which are incorporated herein by reference in its entirety.

TECHNICAL FIELD

Embodiments described herein generally relate to systems and methods for generating training data for machine learning models, and more specifically natural language processing (NLP) models.

BACKGROUND

Network devices generate log records as part of their routine operation. These log records may include data related to the devices' operation, such as timestamps of actions, interactions with other network devices, etc.

Log records generated by different sources may appear considerably different from one another. For example, they may be formatted differently or may include different types of data. Even log records generated by the same types of devices may be formatted differently due to the designing engineer's specifications or preferences.

Existing techniques for parsing or otherwise analyzing generated log records require non-trivial engineering efforts dedicated to each specific source or source type to address these differences in format and data content. Analyzing log records from various log sources typically requires building specifically tailored parsing solutions and often requires manual oversight. These existing techniques are time consuming and resource intensive.

A need exists, therefore, for more efficient systems and methods for parsing log records.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for training a language processing model. The method includes receiving at an interface a first log record in a first format, wherein the first log record includes annotations describing items in the first log record, creating a second log record in a second format comprising data from the first log record utilizing the annotations in the first log record and a conversion rule set, and providing the second log record to a processor executing instructions stored on a memory to provide a language processing model, resulting in a trained model configured to identify items in a third log record and relationships therebetween, wherein the conversion rule set is associated with the language processing model.

In some embodiments, creating the second log record includes converting the first log record into a list of tuples required by the language processing model.

In some embodiments, the described items in the first log record include at least one of an IP address, a byte count, a port, and a user name.

In some embodiments, the language processing model is configured to output a probabilistic assessment regarding the items identified in the third log record and the relationships therebetween.

In some embodiments, the language processing model is implemented as a convolutional neural network.

In some embodiments, the language processing model is configured to semantically map the third log record into desired log values.

In some embodiments, the trained model executes at least two different natural language processing packages that are each defined by a different conversion rule set.

In some embodiments, the method further includes providing the identified items in the previously unseen log records and the relationships therebetween to a threat detection module for analysis to detect malicious activity.

In some embodiments, the method further includes providing the identified items in the third log records and the relationships therebetween to a log searching tool configured to conduct searches on log records.

According to another aspect, embodiments relate to a system for training a language processing model. The system includes an interface for receiving a first log record in a first format, wherein the first log record includes annotations describing items in the first log record; a mapping module configured to execute a conversion rule set to create a second log record in a second format comprising data from the first log record utilizing the annotations in the first log record; and a processor executing instructions stored on a memory to receive the second log record and provide a language processing model, resulting in a trained model configured to identify items in a third log record and relationships therebetween, wherein the conversion rule set is associated with the language processing model.

In some embodiments, the second format includes a list of tuples required by the language processing model.

In some embodiments, the described items in the first log record include at least one of an IP address, a byte count, a port, and a user name.

In some embodiments, the language processing model is configured to output a probabilistic assessment regarding the items identified in the third log record and the relationships therebetween.

In some embodiments, the language processing model is implemented as a convolutional neural network.

In some embodiments, the language processing model is configured to semantically map the third log record into desired log values.

In some embodiments, the trained model is configured to execute at least two different natural language processing packages that are each defined by a different conversion rule set.

In some embodiments, the processor is further configured to provide the identified items in the third log record and the relationships therebetween to a threat detection module for analysis to detect malicious activity.

In some embodiments, the processor is further configure to provide the identified items in the third log record to a log searching tool configured to conduct searches on log records.

According to yet another aspect, embodiments relate to a non-transitory computer readable medium containing computer-executable instructions for performing a method for training a language processing model. The medium includes computer-executable instructions for receiving at an interface a first log record in a first format, wherein the first log record includes annotations describing items in the first log record, computer-executable instructions for creating a second log record in a second format comprising data from the first log record utilizing the annotations in the first log record and a conversion rule set, and computer-executable instructions for providing the second log record to a processor executing instructions stored on a memory to provide a language processing model, resulting in a trained model configured to identify items in a third log record and relationships therebetween, wherein the conversion rule set is associated with the language processing model.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Most, if not all, computing devices generate log records as part of their routine operation. For example, a firewall generates records logging which devices connect or otherwise interact therewith. In this case, the generated log records may include data such as the IP address of a device that interacted with the firewall, as well as a timestamp of said interaction.

Different types of devices may of course generate different types of log records. That is, the logged data associated with devices may vary across different types of devices that perform different functions.

Web applications such as social media platforms similarly generate an extraordinary amount of log records. For social media platforms, for example, this data may relate to profiles of users, dates of activity, a user's friends or followers, or the like.

Different types of devices may generate different types of log records. That is, the data present in generated logs may vary across different types of devices that perform different functions. Accordingly, the log records from these different devices, services, or platforms may look considerably different from each other.

Even log records associated with the same types of devices may look considerably different from each other if differently designed or configured. For example, the engineers configuring different firewalls may have their own preferences or specifications regarding what data is collected and how that data is logged and presented.

The number of log record sources will likely continue to increase in the future. This increase will likely be accompanied by an increase in the number of different types or formats of log records associated with the sources.

Existing log parsers are ill-suited to analyze log records with different formats. For example, existing log parsers are generally only configured to analyze log records associated with a particular source or log records in a particular format. Accordingly, they may be unable to analyze previously unreviewed log records to adequately identify items therein and the relationships between those items.

Applicant has applied NLP techniques to analyze log records. NLP generally requires a language model trained on a corpus of speech or text that is sufficiently similar to a target document to be ingested and parsed.

NLP has traditionally been applied to human-generated language. These applications rely on language-specific models trained on manually-annotated and curated data. These datasets may be developed over years or even decades from the involvement of countless individuals.

For example, the human language sentence "the quick brown fox jumps over the lazy dog" may be annotated to indicate that "fox" is the subject, "quick" is an adjective that modifies the subject, "dog" is an object, etc.

With respect to log records, an annotation may involve identifying items such as IP addresses, ports, bytes, usernames, actions, timestamps, durations of activities, or the like. The type of items in a log record may of course vary and may depend on the source associated with the log record.

Many existing log analysis tools have mechanisms carefully crafted to ingest and understand logs, but only logs from particular sources and in particular formats. Although these methods and techniques are precise, they are by design only able to analyze particular log records. Accordingly, these existing methods and techniques are not well suited to handle log records from previously unseen sources.

The present application discloses novel systems and methods for training language processing models to parse log records. The features of the various embodiments herein apply a natural language processing approach that utilizes machine learning techniques to dynamically develop statistical models.

The systems and methods described herein convert existing normalized records from parsing products into a format suitable for the model training process. This enables the systems and methods to leverage existing data that has already undergone some degree of human curation to quickly develop a model that is tailored to a known body of log record data. This is in contrast to existing techniques, which generally require the manual annotation of data for model construction.

In accordance with various embodiments, a first annotated log record in a first format may be provided to a mapping module to execute a conversion rule set to convert the first log record into a second log record in a second format. The second log record may include all or some of the data from the first log record. The second log record may be provided to a processor executing instructions stored on a memory to provide a language processing model, resulting in a trained model configured to identify items in a third log record and relationships therebetween.

Figure 1:
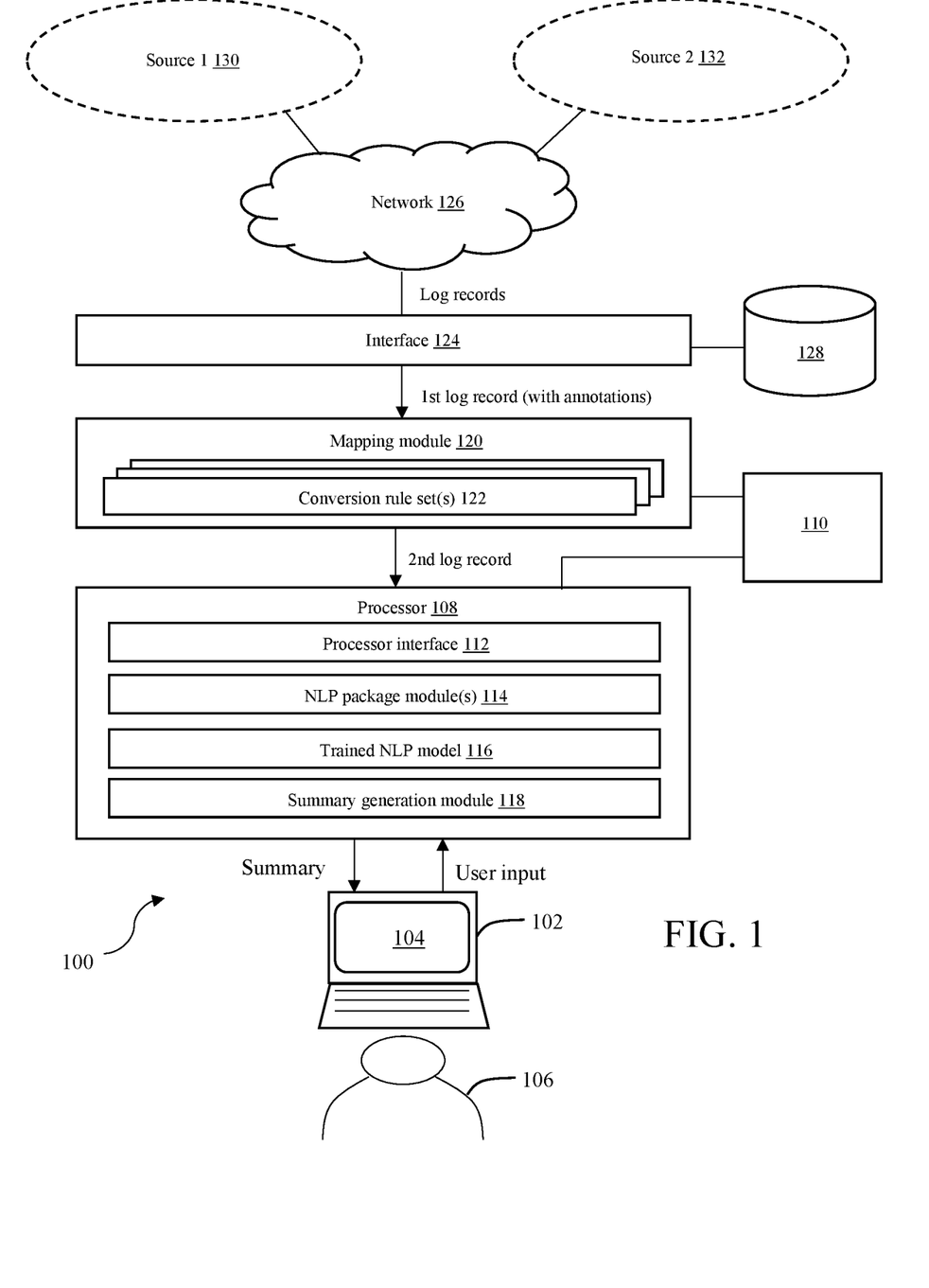
FIG. 1 illustrates a system for training a language processing model in accordance with one embodiment.

FIG. 1 illustrates a system 100 for training a language processing model in accordance with one embodiment. The system 100 includes a user device 102 executing a user interface 104 for presentation to one or more users 106 such as security personnel or other users interested in the content of log records associated with various sources.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106. The user interface 104 may allow the user 106 to supply parameters regarding which log records to analyze and other types of parameters.

The user device 102 may be in operable communication with one or more processors 108. The processors 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include a processor interface 112, an NLP package module 114, the resultant trained NLP model 116, and a summary generation module 118.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/ type of memory 110 may of course vary as long as instructions for training a language processing model can be executed by the processor 108 to accomplish the objectives of various embodiments described herein.

The processor interface 112 may be in communication with a mapping module 120 configured to execute one or more conversion rule sets 122 to map an annotated log record into a target format. For example, the mapping module 120 may receive a first log record in a first format. The first log record may be received at an interface 124 that is on otherwise able to access one or more network(s) 126. The first log record may be received from one or more databases 128, and may be associated with a first source 130 or a second source 132 on the network(s) 126.

The network(s) 126 may link the various devices with various types of network connections. The network(s) 126 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 126 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link The first log record may have been previously annotated by a human user to include labels and values regarding items in therein. For example, the first log record may be accompanied by key-value pairs indicating values such as a source IP address, a destination IP address, byte counts, usernames, device labels, timestamps of actions, dates of actions, duration values of actions, etc. The type of values annotated may vary and may of course depend on the source associated with the first log record.

Figure 2:
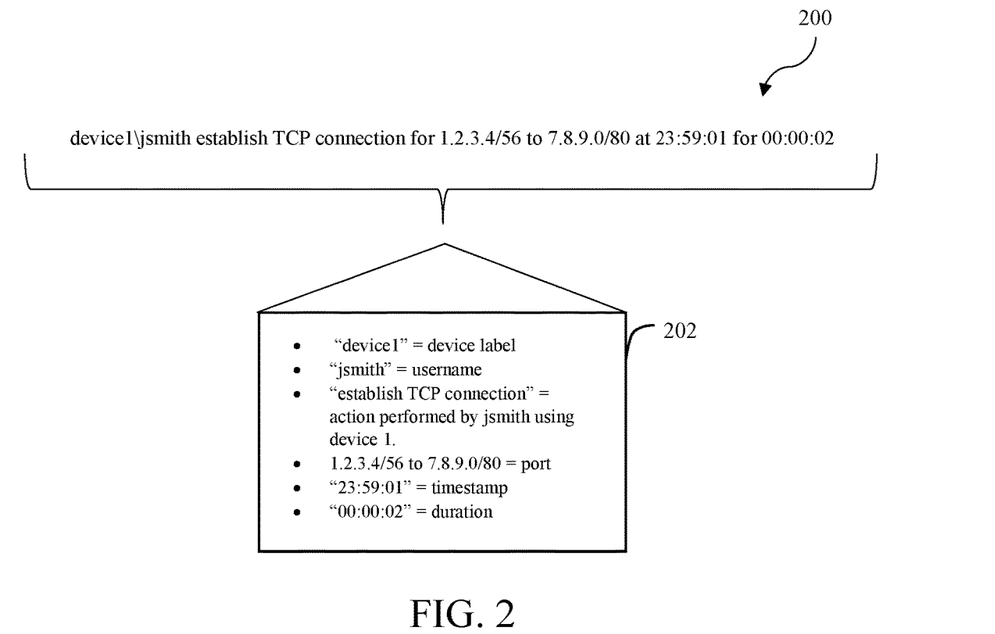
FIG. 2 illustrates an exemplary log record with annotations in accordance with one embodiment.

FIG. 2 illustrates an exemplary log record 200 "device1\jsmith establish TCP connection for 1.2.3.4/56 to 7.8.9.0/80 at 23:59:01 for 00:00:02." The log record 200 may describe an action associated with a firewall, for example.

This log record 200 may have been previously annotated with labels and values. Annotation list 202, for example, provides labels identifying various items in the log record 200. These labels identify "device1" as corresponding to a device label, "jsmith" as corresponding to a username, "establish TCP connection" as corresponding to an action performed by j smith using device1, "1.2.3.4/56 to 7.8.9.0/80" as corresponding to ports, "23:59:01" as corresponding to a timestamp, and "00:00:02" as corresponding to a duration value.

Log record 200 is only exemplary and other types of log records may be considered in conjunction with the systems and methods described herein. The format of log records and types of data present in the log records may vary and may depend on the type of device or source associated with said log record.

Referring back to FIG. 1, a first log record with annotations such as log record 200 of FIG. 2 may be communicated from the interface 124 to the mapping module 120. The mapping module 120 may then execute a conversion rule set 122 to convert the annotated log record into a format suitable for generating an NLP model.

The conversion rule set 122 that is executed may depend on the NLP package module 114 used to generate the trained NLP model 116. Accordingly, each conversion rule set 122 may perform different transformations or steps to convert the received annotated log records into a form suitable for the particular NLP package module 114.

A particular NLP package module 114 may require the received log record to be in a certain format or require certain information about the received log record. In some embodiments, an NLP package module 114 may require positional definitions of where particular types of values start and stop.

Figure 3:
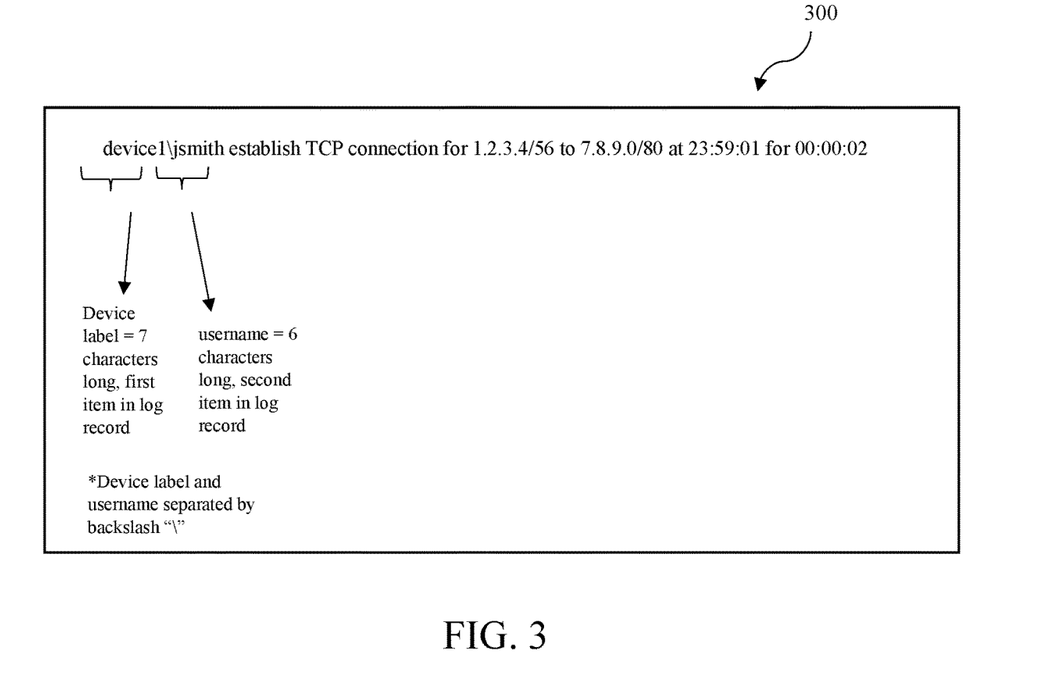
FIG. 3 illustrates a converted dataset in accordance with one embodiment.

For example, FIG. 3 illustrates a converted dataset 300 in accordance with one embodiment. The converted dataset 300 shows the positions and character lengths of the device label and the username items in the log record 200 of FIG. 2. This information therefore describes the positions and lengths of individual items in the log record, as well as any punctuation marks or characters delineating the individual items.

The converted dataset 300 shown in FIG. 3 is only exemplary. Other items in the log record, as well as the positions and lengths thereof, may be labelled as in FIG. 3 to produce a second log record in a second format. Although only one log record is shown in the converted dataset 300, the conversion rules set 122 may similarly convert log records in batches of thousands or millions of records at a time. In some embodiments, the converted dataset 300 may comprise a list of tuples required by the NLP package module 114.

The converted data such as the converted dataset 300 may be communicated to the processor 108. Specifically the processor interface 112 may receive the converted dataset 300 and provide the dataset 300 to the NLP package module 114.

The NLP package module 114 may be tasked with executing an NLP model training process. This training process in effect allows the resulting trained NLP model 116 to internalize patterns and idiosyncrasies that relate meaningful labels to specific values within raw data logs.

In some embodiments, the NLP package module 114 may execute or otherwise be based on a convolutional neural network (CNN) or other type of machine learning framework useful in text sequencing or pattern identification.

Figure 4:
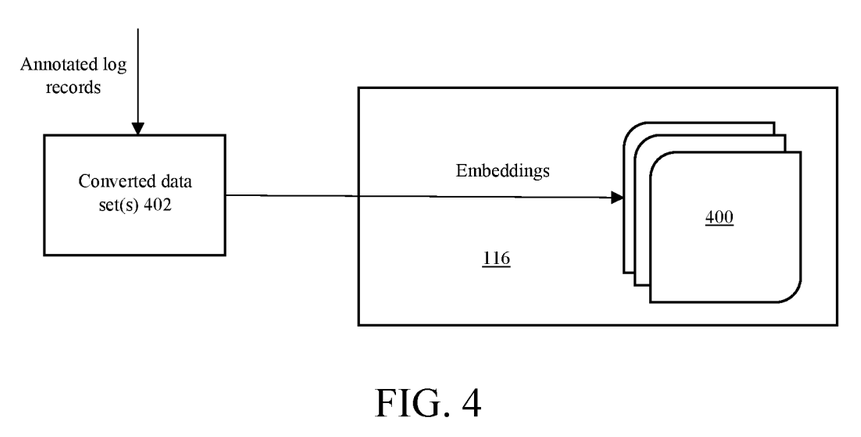
FIG. 4 illustrates the converted dataset of FIG. 3 being used to train a convolutional neural network in accordance with one embodiment.

A CNN may be trained on the items identified in log records and the resultant converted datasets such as those shown in FIGS. 2 and 3. As seen in FIG. 4, for example, a CNN 400 may be trained on converted dataset(s) 402 resulting from annotated log records as discussed previously. This corpus of data may be built from hundreds of annotated log record lines and their corresponding converted datasets. These may be collected over a period of time and from different log sources such as sources 130 and 132 of FIG. 1.

During training, the CNN 400 may receive the converted dataset(s) 402 and convert them into a matrix to represent each item of interest and accompanying data as numbers. The CNN 400 may also analyze embedded items to learn or otherwise distinguish various classes of log records and data therein.

A CNN is only one type of framework that may be used for training an NLP model. Any other type of machine learning or artificial intelligence framework may be used as long as it can accomplish the features of the embodiments described herein.

Once trained, the NLP model 116 may ingest previously unencountered raw log records. The trained NLP model 116 may then, in response, return key-value pairs that include meaningful labels and values of interest. At this point, the NLP model 116 has been trained on sufficiently similar, though not necessarily identical, log record types so as to be capable of parsing previously unencountered records (or at least make an attempt at doing so).

Figure 5A:
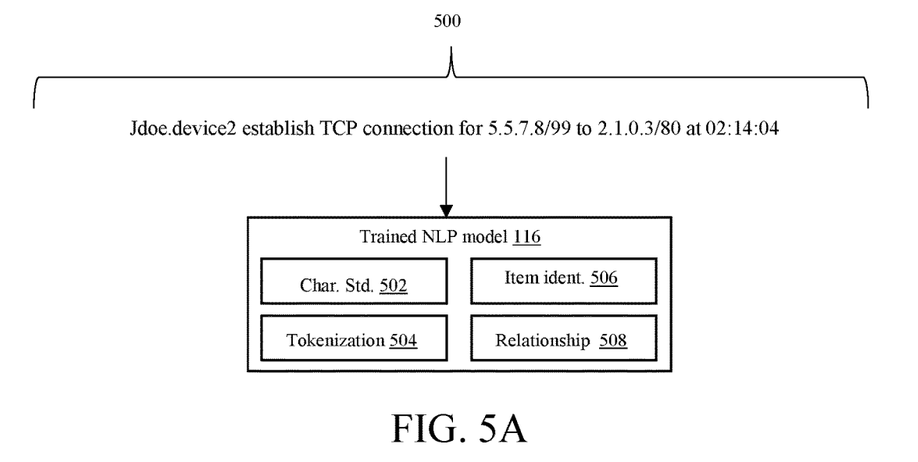
FIGS. 5A-C illustrate the trained natural language processing (NLP) model of FIG. 1 receiving and analyzing a previously unseen log record in accordance with one embodiment.
Figure 5B:
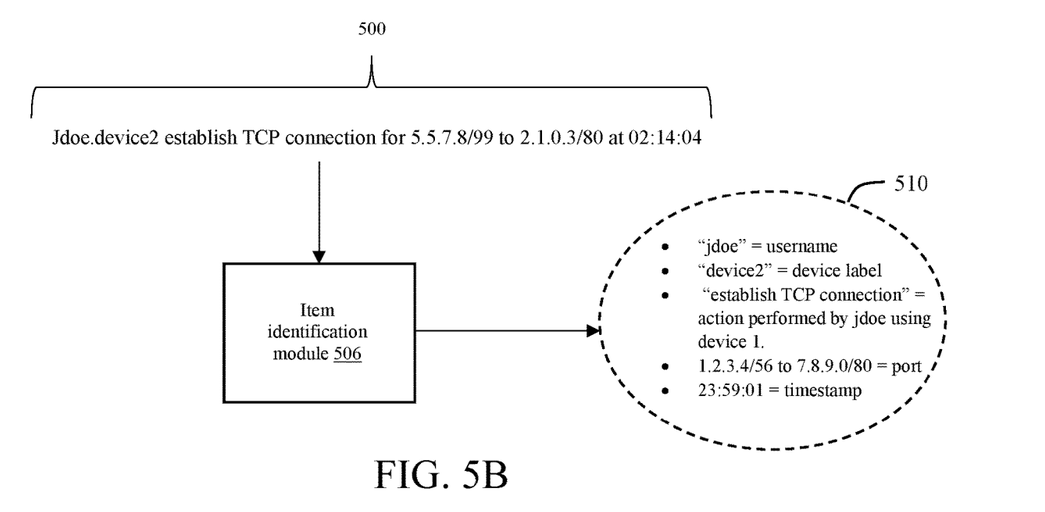
Figure 5C:
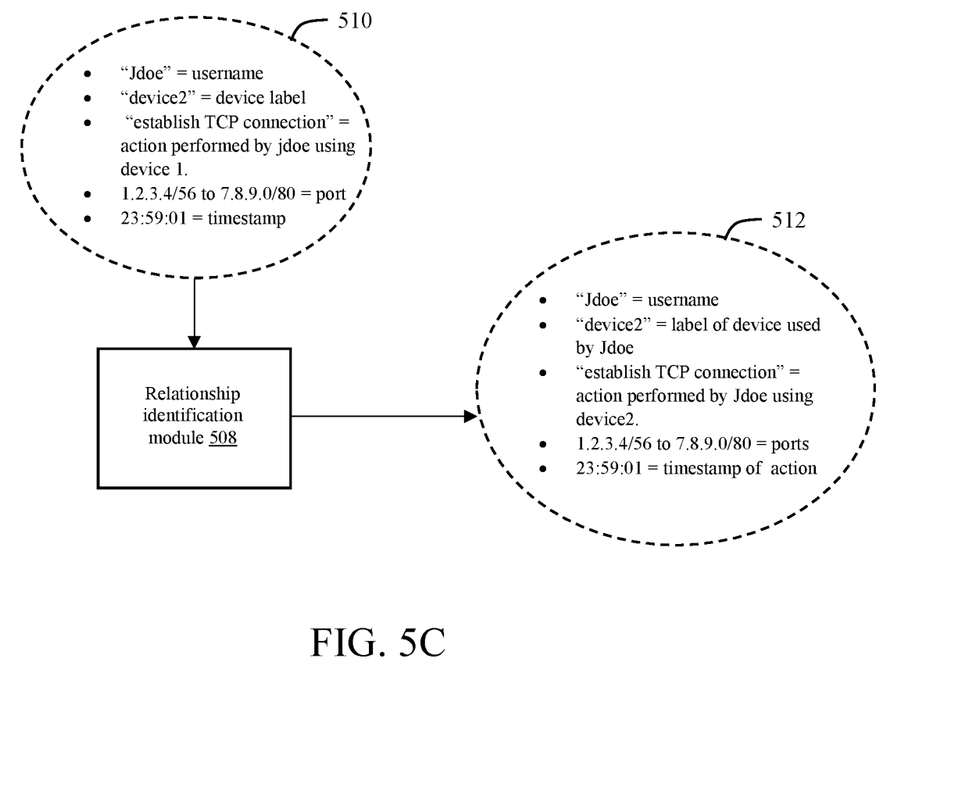

FIGS. 5A-C illustrate an exemplary operation in which the trained NLP model 116 receives a third log record 500 (or a line thereof). The third log record 500 may have been previously unencountered by the trained NLP model 116. The third log record 500 may be similar to (but perhaps not identical in format) to the first log record 200 of FIG. 2. For example, the order of the username and the device label is switched in the third log record 500. Additionally, the third log record 500 does not include a duration value.

A character standardization module 502 and a tokenization module 504 may first perform any pre-processing steps. For example, the character standardization module 502 may convert all characters into lower case, and the tokenization module 504 may detect components such as slashes or other types of punctuations to break the third log record 500 into discrete components.

An item identification module 506 may recognize that the first portion of the third log record 500 corresponds to the particular device or source of the log record. Similarly, the item identification module 506 may recognize that a series of numbers separated by colons represents either a timestamp of an action or the duration of an action.

More specifically, the item identification module 506 may understand that integers separated by periods "." refer to a port number. For example, the item identification module 506 may recognize "99" in 5.5.7.8/99 and "80" in 2.1.0.3/80 as port numbers.

As seen in FIG. 5B, the item identification module 506 may analyze the third log record 500 to identify items therein. The item identification module 506 may then output a list 510 of items identified in the third log record 500.

FIG. 5C illustrates the list 510 generated by the item identification module 506 in FIG. 5B being provided to the relationship identification module 508. The relationship identification module 508 may identify relationships between the items identified by the item identification module 506 in FIG. 5B.

For example, the relationship identification module 508 may recognize that the user's username immediately follows the device label. That is, the user represented by the username "Jdoe" is the user of the device represented by the device label "device2."

Referring back to FIG. 1, the summary generation module 118 may provide a report to the user 106 regarding the identified items of interest and the relationships therebetween. The provided report(s) may be similar in format to, for example, the lists 510 and 512 of FIGS. 5B & C.

Over time, the training data can be expanded to account for new sources of log records. Accordingly, the underlying trained NLP model 116 may continue to evolve to be able to handle more variety with respect to different types of log records.

Figure 6:
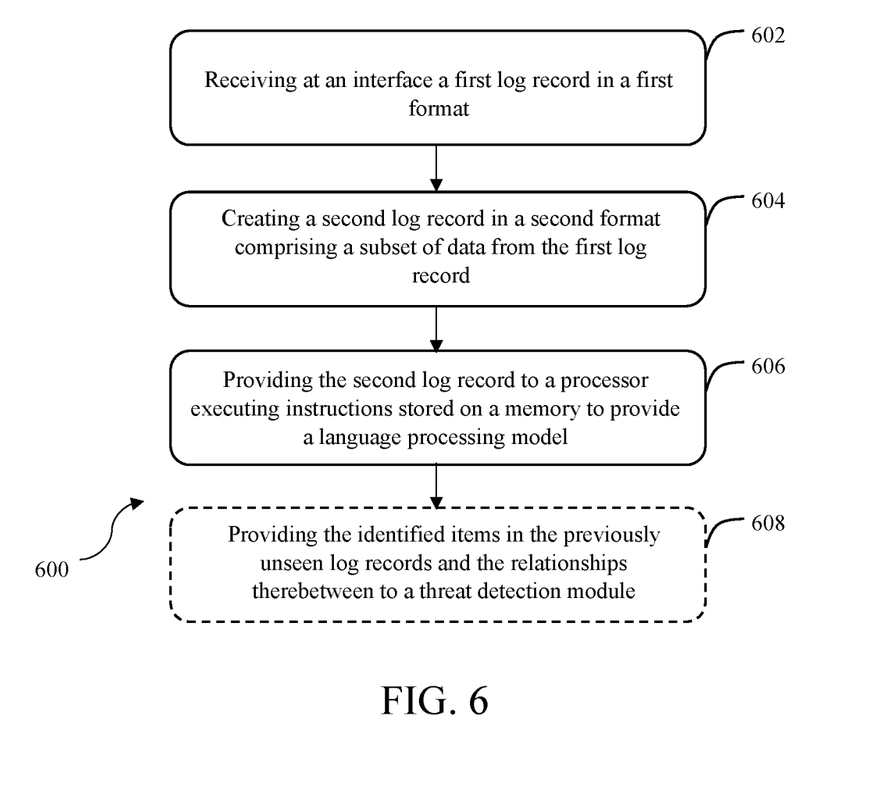
FIG. 6 depicts a flowchart of a method for training a language processing model in accordance with one embodiment.

FIG. 6 depicts a flowchart of a method 600 for training a language processing model in accordance with one embodiment. Method 600 may be performed by the components of system 100 of FIG. 1, for example.

Step 602 involves receiving at an interface a first log record in a first format, wherein the first log record includes annotations describing items in the first log record. This log record may be associated with any type of source or device on a network such as, but not limited to, firewalls, printers, social media platforms, routers, PCs, laptops, tablets, mobile devices, switches, or the like.

As discussed previously, the first log record may have been previously annotated to include details describing items therein. These details may include data regarding actions performed by the associated source as well as interactions with other types of devices or sources.

Step 604 involves creating a second log record in a second format comprising data from the first log record utilizing the annotations in the first log record and a conversion rule set. Step 604 may be performed a mapping module such as the mapping module 120 of FIG. 1. As discussed previously, the mapping module 120 may execute conversion rule set(s) 122 to convert the annotated first log record into a converted dataset (i.e., the second log record). The second format may be a different format than the first format, and may be dependent on the NLP package ultimately used.

Step 606 involves providing the second log record to a processor executing instructions stored on a memory to provide a language processing model, resulting in a trained model configured to identify items in a third log record and relationships therebetween. The third log record may refer to a log record that has not been previously encountered.

The trained NLP model 116 may ingest and understand previously unencountered raw log records and identify items of interest therein. In addition to identifying items, the trained NLP model 116 may return key-value pairs that include meaningful labels and values of interest. For example, the trained NLP model may be configured to semantically map the third log record into desired log values suitable for analysis by other services or tools.

The trained NLP model may be unable to identify items and relationships with absolute certainty. Accordingly, the summary generation module 118 of FIG. 1 may provide a probabilistic assessment of the identified type of an item (e.g., a port number, a timestamp, a duration value, etc.). Similarly, the trained NLP model may provide a probabilistic assessment of the identified relationship between items of a log record Step 608 involves providing the identified items in the previously unseen log records and the relationships therebetween to a threat detection module for analysis to detect malicious activity associated with the third log record. Once the items in a log record are identified and their meanings understood, they can be more meaningfully ingested by other products such as threat detection tools or other log searching tools or services.

In some embodiments, a processor such as the processor 108 of FIG. 1 may issue an alert to a user upon detecting activity from the identified items or relationships that is malicious or otherwise anomalous. These types of alerts may be presented to a user via the user interface 104 and may be a visual alert, a text alert, an audio alert, a haptic-based alert, or some combination thereof.

A user may investigate the data further and perform any appropriate mitigation steps. Additionally or alternatively, these mitigation steps may be implemented autonomously.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
   performing, by a threat detection system implemented by one or more computing devices:
   receiving a batch of log records indicating operations of devices in a network, wherein individual log records in the batch are formatted in a first format that indicates annotations of individual items in the log records;
   using a conversion rule set associated with a first natural language processing (NLP) package, converting the batch of log records to a training dataset of records, wherein individual records in the training dataset are formatted in a second format that indicates positions and lengths of individual items in the records;
   using the training dataset, training a NLP model to identify respective types of items in records of the second format and relationships between the items in the records;
   after the NLP model is trained:
   using the conversion rule set and the NLP model to monitor additional log records in the first format; and
   based on the monitoring, detecting an anomalous or malicious activity in the network; and
   after initiation of the monitoring of the additional log records using the conversion rule set and the NLP model:
   deploying another NLP package that requires training records in a third format;
   storing another conversion rule set associated with the other NLP package; and
   using the other conversion rule set to convert further log records into the third format.

2. The method of claim 1, further comprising:
   generating a user alert in response to the detecting of the anomalous or malicious activity in the network.

3. The method of claim 1, further comprising:
   based on the monitoring, extracting and storing items and relationships identified in the additional log records; and
   using the extracted items and relationships to search the additional log records.

4. The method of claim 1, wherein
   the NPL package requires training records in the second format.

5. The method of claim 1, wherein NLP model is trained to semantically map an individual log record into log values analyzed by the NLP package.

6. The method of claim 1, wherein the third format indicates one or more punctuation marks or characters used to delineate individual items in training records of the third format.

7. The method of claim 1, wherein the NLP model is a convolutional neural network.

8. The method of claim 1, wherein the individual log records in the batch indicate actions observed in the network comprising:

a timestamp of the action,
a device associated with the action, and
a user associated with the action.

9. The method of claim 8, wherein a particular one of the log records indicates a connection from a source device to a destination device, comprising:
a source address of the source device,
a destination address of the destination device,
a duration of the connection, and
a number of bytes transferred over the connection.

10. The method of claim 1, the NLP model training system is configured to receive log records from a plurality of different sources and periodically convert the received log records into training data using different conversion rule sets.

11. A system comprising:
a threat detection system implemented by one or more computing devices, configured to:
receive a batch of log records indicating operations of devices in a network, wherein individual log records in the batch are formatted in a first format that indicates annotations of individual items in the log records;
use a conversion rule set associated with a first natural language processing (NLP) package to convert the batch of log records to a training dataset of records, wherein individual records in the training dataset are formatted in a second format that indicates positions and lengths of individual items in the records;
use the training dataset to train a NLP model to identify respective types of items in additional records of the second format and relationships between items in the additional records;
after the NLP model is trained:
use the conversion rule set and the NLP model to monitor additional log records in the first format; and
based on the monitoring, detect an anomalous or malicious activity in the network; and
after initiation of the monitoring of the additional log records using the conversion rule set and the NLP model:
deploy another NLP package that requires training records in a third format;
store another conversion rule set associated with the other NLP package; and
use the other conversion rule set to convert further log records into the third format.

12. The system of claim 11, wherein the threat detection system is configured to:
generate a user alert in response to the detecting of the anomalous or malicious activity in the network.

13. The system of claim 11, wherein the threat detection system includes a log searching system implemented by one or more computing devices, configured to:
use the conversion rule set and the NLP model to extract and store items and relationships identified in additional log records; and
use the extracted items and relationships to search the additional log records.

14. The system of claim 11, wherein
the NPL package requires training records in the second format.

15. The system of claim 11, wherein NLP model is trained to semantically map an individual log record into log values analyzed by the NLP package.

16. The system of claim 11, wherein the third format indicates one or more punctuation marks or characters used to delineate individual items in training records of the third format.

17. The system of claim 11, wherein the NLP model is a convolutional neural network.

18. The system of claim 11, wherein the NLP model is trained to output a probabilistic assessment of an item type or relationship identified in a particular input record.

19. The system of claim 11, wherein the NLP model training system is configured to receive log records from a plurality of different sources over a wide area network.

20. One or more non-transitory computer readable media storing program instructions that when executed on one or more processors cause the one or more processors to implement a threat detection system and to:
receive a batch of log records indicating operations of devices in a network, wherein individual log records in the batch are formatted in a first format that indicates annotations of individual items in the log records;
use a conversion rule set associated with a first natural language processing (NLP) package to convert the batch of log records to a training dataset of records, wherein individual records in the training dataset are formatted in a second format that indicates positions and lengths of individual items in the records;
use the training dataset to train a NLP model to identify respective types of items in additional records of the second format and relationships between items in the additional records;
after the NLP model is trained:
use the conversion rule set and the NLP model to monitor additional log records in the first format; and
based on the monitoring, detect an anomalous or malicious activity in the network; and
after initiation of the monitoring of the additional log records using the conversion rule set and the NLP model:
deploy another NLP package that requires training records in a third format;
store another conversion rule set associated with the other NLP package; and
use the other conversion rule set to convert further log records into the third format.

* * * * *